US005644176A

United States Patent [19]
Katagiri et al.

[11] Patent Number: 5,644,176
[45] Date of Patent: Jul. 1, 1997

[54] LINEAR DIRECT CURRENT MOTOR

[75] Inventors: Satoru Katagiri, Saitama; Hidehito Oohira, Tokyo; Shouji Fujisawa, Kanagawa, all of Japan

[73] Assignee: Nippon Thompson Co., Ltd., Tokyo, Japan

[21] Appl. No.: 334,366

[22] Filed: Nov. 3, 1994

[30] Foreign Application Priority Data

Nov. 19, 1993 [JP] Japan ................. 5-314374

[51] Int. Cl.$^6$ .................................. H02K 41/02
[52] U.S. Cl. ........................... 310/12; 310/68 B
[58] Field of Search ......................... 310/12, 68 B

[56] References Cited

U.S. PATENT DOCUMENTS

| 5,023,495 | 6/1991 | Ohsaka et al. | 310/12 |
| 5,130,583 | 7/1992 | Andoh | 310/12 |
| 5,218,250 | 6/1993 | Nakagawa | 310/12 |
| 5,225,725 | 7/1993 | Shiraki et al. | 310/12 |
| 5,357,158 | 10/1994 | Takei | 310/12 |
| 5,473,992 | 12/1995 | Takei | 104/290 |
| 5,530,303 | 6/1996 | Takei | 310/12 |
| 5,565,718 | 10/1996 | Takei | 310/12 |

*Primary Examiner*—Thomas M. Dougherty
*Attorney, Agent, or Firm*—Sughrue, Mion, Zinn, Macpeak & Seas

[57] ABSTRACT

A linear direct current motor that is able to maintain thrust at a constant level at all times regardless of changes in the relative positions of the primary and secondary sides. The motor includes a magnetic pole detection magnet having a number of magnetic poles one greater than that of a field magnet, and magnetic pole discrimination elements in the form of Hall effect elements that are acted on by the magnetic pole detection magnet.

11 Claims, 13 Drawing Sheets

LINEAR DIRECT CURRENT MOTOR

BACKGROUND OF THE INVENTION

1. Field of the Invention

The present invention relates to a linear direct current motor commonly used for moving an object to be moved with high accuracy in, for example, a motion mechanism such as a machine tool or industrial robot, and more particularly, to a brushless type of linear direct current motor.

2. Description of the Prior Art

FIG. 1 shows a drive unit containing a linear direct current motor of the prior art. Furthermore, this drive unit has a guide unit for guiding an object added to a linear direct current motor.

As shown in the drawing, this drive unit has a long base member 1 and moving body 2 which moves along said base member 1. More specifically, a plurality of rollers (not shown) are provided on moving body 2, and these rollers roll over a track (not shown) formed along the lengthwise direction in base member 1.

On the other hand, the linear direct current motor which composes the above-mentioned guide unit together with a drive unit is composed in the manner described below.

Said linear direct current motor is composed of a primary side, equipped with a large number of armature coils 5 arranged in a row in the lengthwise direction of base member 1 on said base member 1, and a secondary side, having a field magnet 6 (see FIG. 2) attached to the bottom surface of moving body 2 so as to oppose each of said armature coils 5. As shown in the drawing, said field magnet 6 is magnetized so that a plurality, in this case 4, of N and S magnetic poles are alternately arranged in a row along direction P in which moving body 2 is to move, namely the lengthwise direction of base member 1. Furthermore, as shown in FIG. 2, if the width of one magnetic pole of field magnet 6 is taken to be Pm in this example, the open angle width of each armature coil 5 is set to the same Pm.

In the linear direct current motor of the above-mentioned constitution, by supplying a prescribed excitation current to armature coils 5, thrust is produced based on Fleming's right hand rule between the primary and secondary sides. For example, if base member 1, to which the primary side is coupled, is taken to be the stationary side, moving body 2, integrated into a single unit with the secondary side, is moved by this thrust.

However, in the linear direct current motor as described above, it is important to systematically supply an excitation current to each armature coil to maintain as constant a thrust as possible regardless of changes in the position of the primary side with respect to the secondary side. Continuing, the following provides an explanation of the constitution pertaining to this supply of power.

As shown in FIG. 3, magnetic pole discrimination elements in the form of Hall effect elements 8a through 8f are respectively arranged in the vicinity of each armature coil 5a through 5f (six armature coils are shown in FIG. 3 in this case, and these six armature coils are mutually distinguished by adding small letters of the alphabet from a through f to reference numeral 5 indicating armature coils in the explanation thus far for the sake of convenience in the explanation). In this example, each of Hall effect elements 8a through 8f is arranged corresponding to conductors $5a_1$ through $5f_1$ on one side among the conductors that contribute to thrust possessed on two sides by each armature coil 5a through 5f. These Hall effect elements 8a through 8f emit a signal (in the form a potential difference) corresponding to the lines of magnetic force emitted by each magnetic pole possessed by field magnet 6 when said field magnet 6 approaches. Electrical power is then supplied to the armature coil corresponding to the Hall effect element that emitted said signal based on that signal. On the other hand, this supply of electrical power is interrupted to the armature coil corresponding to a Hall effect element for which said signal has yet to be obtained or is no longer being obtained, thus enabling control to be performed.

Control of the supply of electrical power is performed in the manner described below based on said constitution.

In FIG. 3, the letters A through G indicate that field magnet 6 is located at each of the positions shown in the drawing corresponding to those letters.

To begin with, in the case field magnet 6 is located at position A, each of the magnetic poles of said field magnet 6 act on the four Hall effect elements 8a through 8d. However, the two Hall effect elements 8a and 8d, on which the ends of the magnetic poles of said field magnet 6 act, do not respond. Only the remaining two Hall effect elements 8b and 8c respond. Accordingly, the two armature coils 5b and 5c, which respectively correspond to these Hall effect elements 8b and 8c, are supplied with electrical power. In this state, since each conductor $5b_1$, $5b_2$, $5c_1$ and $5c_2$, which contribute to thrust and of which two each are possessed by each armature coil 5b and 5c, is not acted on by the boundaries of each magnetic pole or ends of the magnetic poles of field magnet 6, and do not end up becoming displaced from each magnetic pole, all of these four conductors generate thrust.

Electrical power is continued to be supplied to the prescribed armature coils in the same manner as described above when field magnet 6 is located at each of the positions of B through G shown in FIG. 3.

Although the above-mentioned linear direct current motor of the prior art operates by supplying excitation current to each armature coil in the manner described above, the following problems occur as described below.

Namely, when field magnet 6 is located at position A shown in FIG. 3, thrust is actually generated by four of the conductors that contribute to thrust possessed by each armature coil as previously described. However, the number of conductors that generate thrust when field magnet 6 is moved to the other positions of B through G changes, namely being 4, 3, 3, 4, 4 and 3 conductors, respectively. Thus, a constant level of thrust cannot be obtained at all times.

SUMMARY OF THE INVENTION

In consideration of the above-mentioned problems of the prior art, the object of the present invention is to provide a linear direct current motor able to maintain a constant level of thrust at all times regardless of changes in the relative positions of the primary and secondary sides.

The linear direct current motor according to the present invention is equipped with: a field magnet in which P number of poles (P being an integer of at least 2) are arranged and magnetized so that they are sequentially different; a group of armature coils wound so that the open angle width of the conductors contributing to thrust is roughly 2n−1 times (where n is an integer of at least 1) the magnetic pole width of said field magnet, which relatively drive said field magnet by being arranged so as to oppose said field magnet and supplying excitation current; a magnetic pole detection magnet, having the same magnetic pole width and magnetized state as said field magnet, and arranged roughly parallel to said field magnet; and, magnetic pole discrimination elements, provided corresponding to each said armature coil, which perform discrimination of the magnetic poles of said magnetic pole detection magnet; wherein, the number of magnetic poles of said magnetic pole detection magnet is set to be P+(2n−1) and each magnetic pole of said magnetic pole detection magnet and each said magnetic pole discrimination element is arranged to be mutually corresponding in the same phase.

DESCRIPTION OF THE PREFERRED EMBODIMENTS

The following provides an explanation of a drive unit containing a linear direct current motor as claimed in the present invention with reference to the drawings. Furthermore, this linear direct current motor is of the moving magnet type.

Said drive unit is composed by mutually combining a guide unit which supports an object to be moved and guides said object with high accuracy, and a linear direct current motor which functions as a driving device that drives said guide unit.

To begin with, the following provides an explanation of the above-mentioned guide unit.

Figure 1:
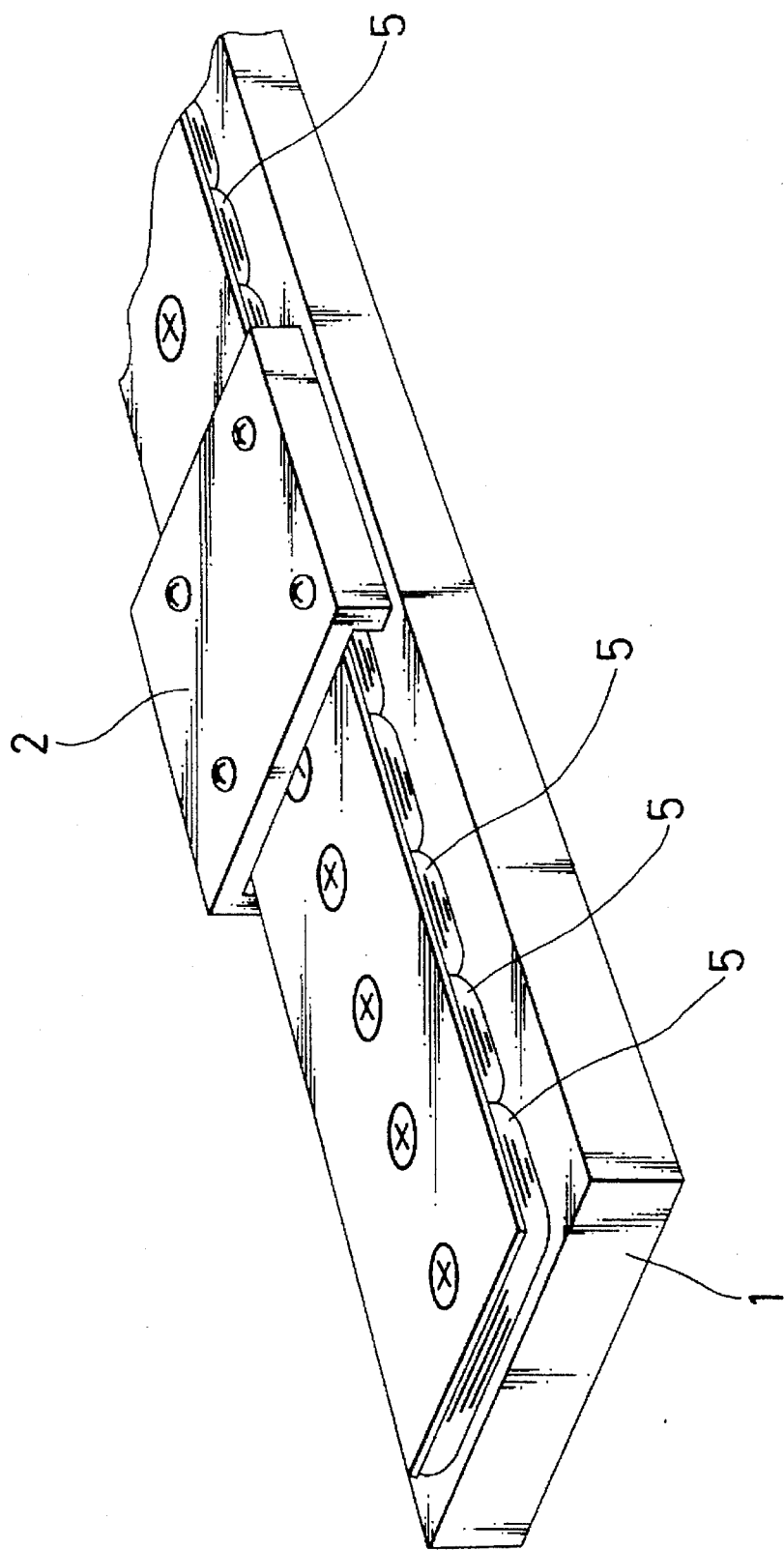
FIG. 1 is a perspective view of a portion of a drive unit containing a linear direct current motor of the prior art.
Figure 2:
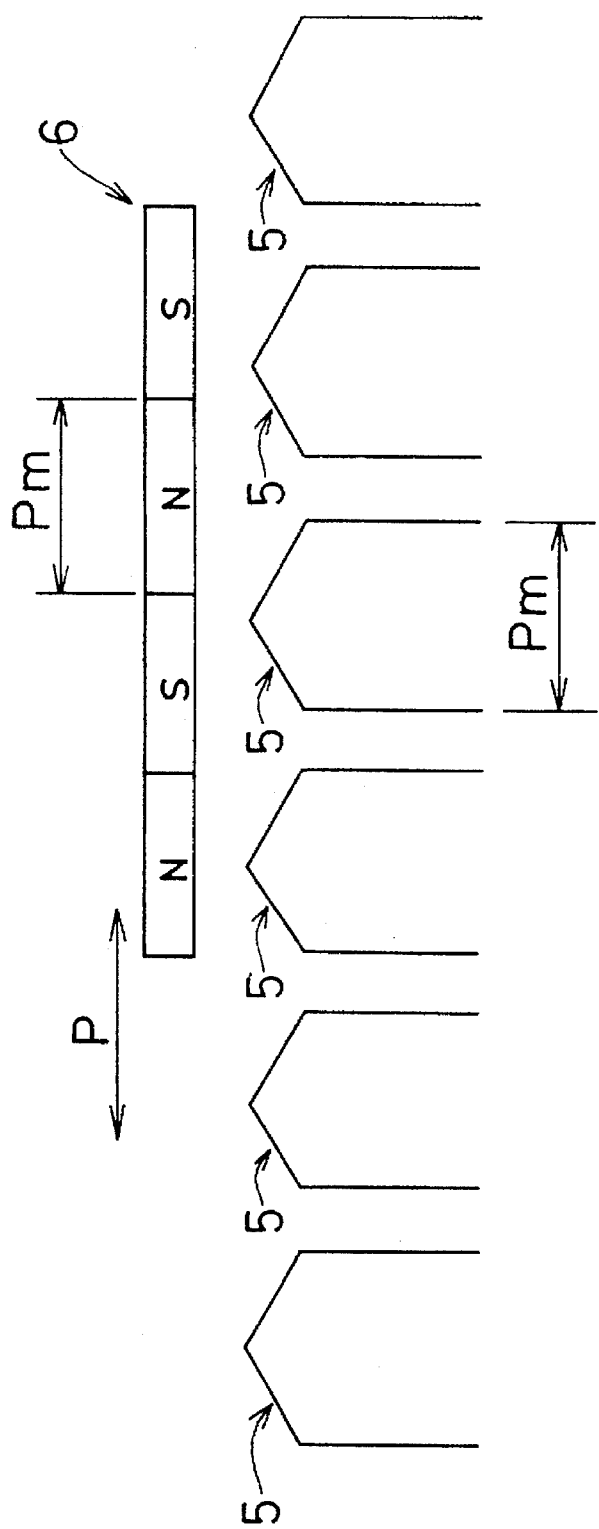
FIG. 2 is a conceptual drawing of the constitution of a linear direct current motor containing the drive unit shown in FIG. 1.
Figure 3:
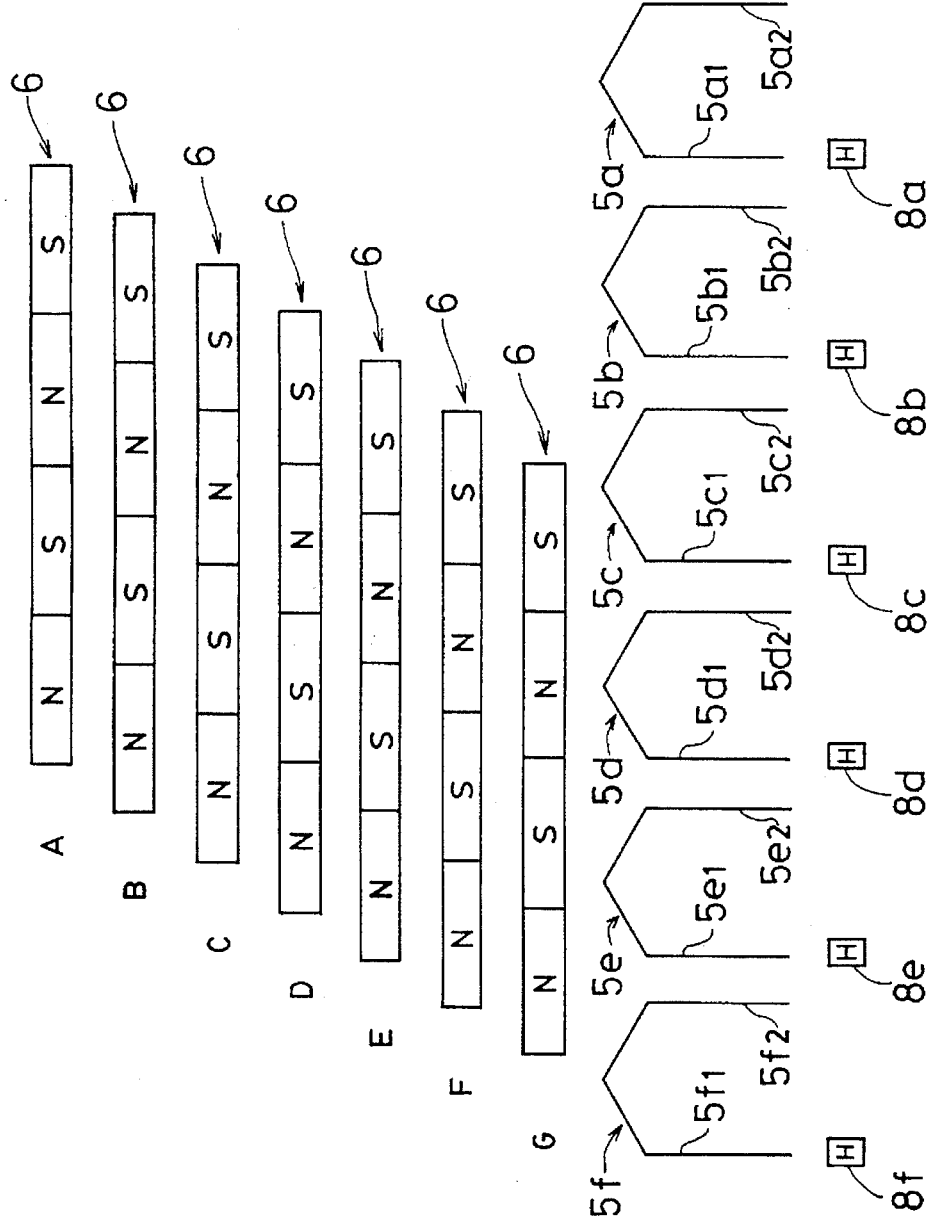
FIG. 3 is an explanatory drawing of the operation of a linear direct current motor containing the drive unit shown in FIG. 1.
Figure 4:
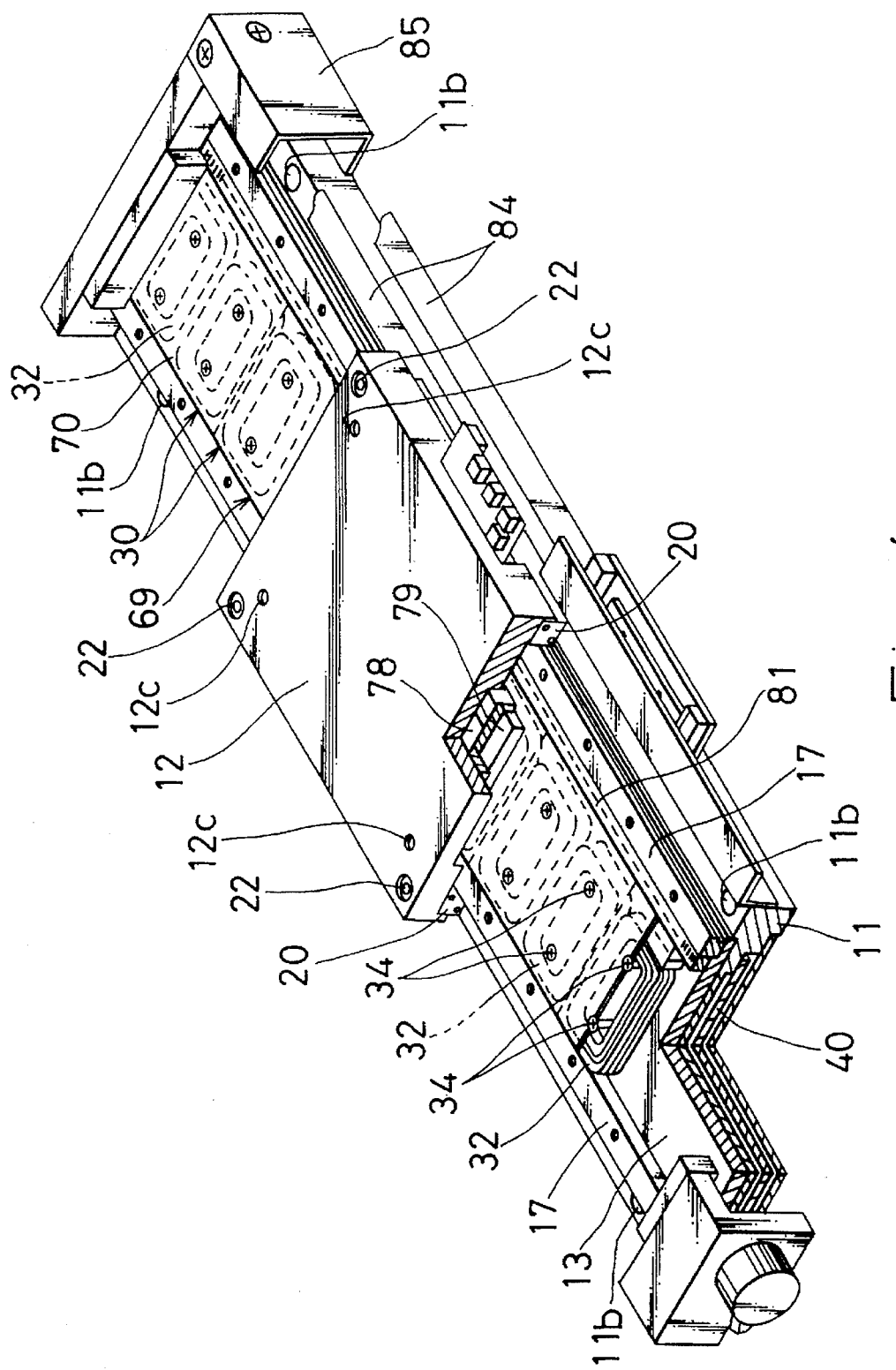
FIG. 4 is a perspective view, including a partial cross-section, of a drive unit containing a linear direct current motor as an embodiment of the present invention.
Figure 5:
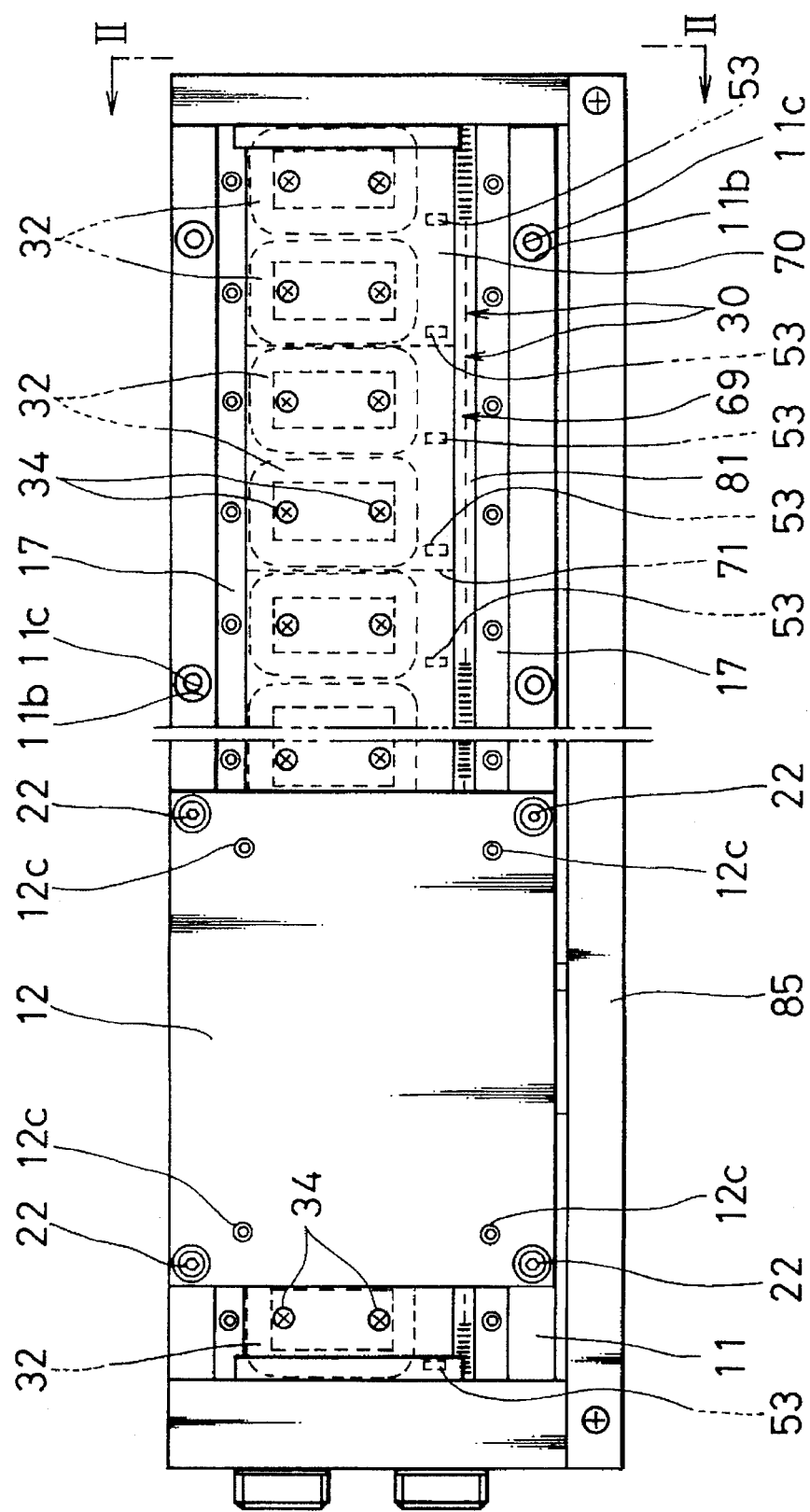
FIG. 5 is an overhead view of the drive unit shown in FIG. 4.
Figure 6:
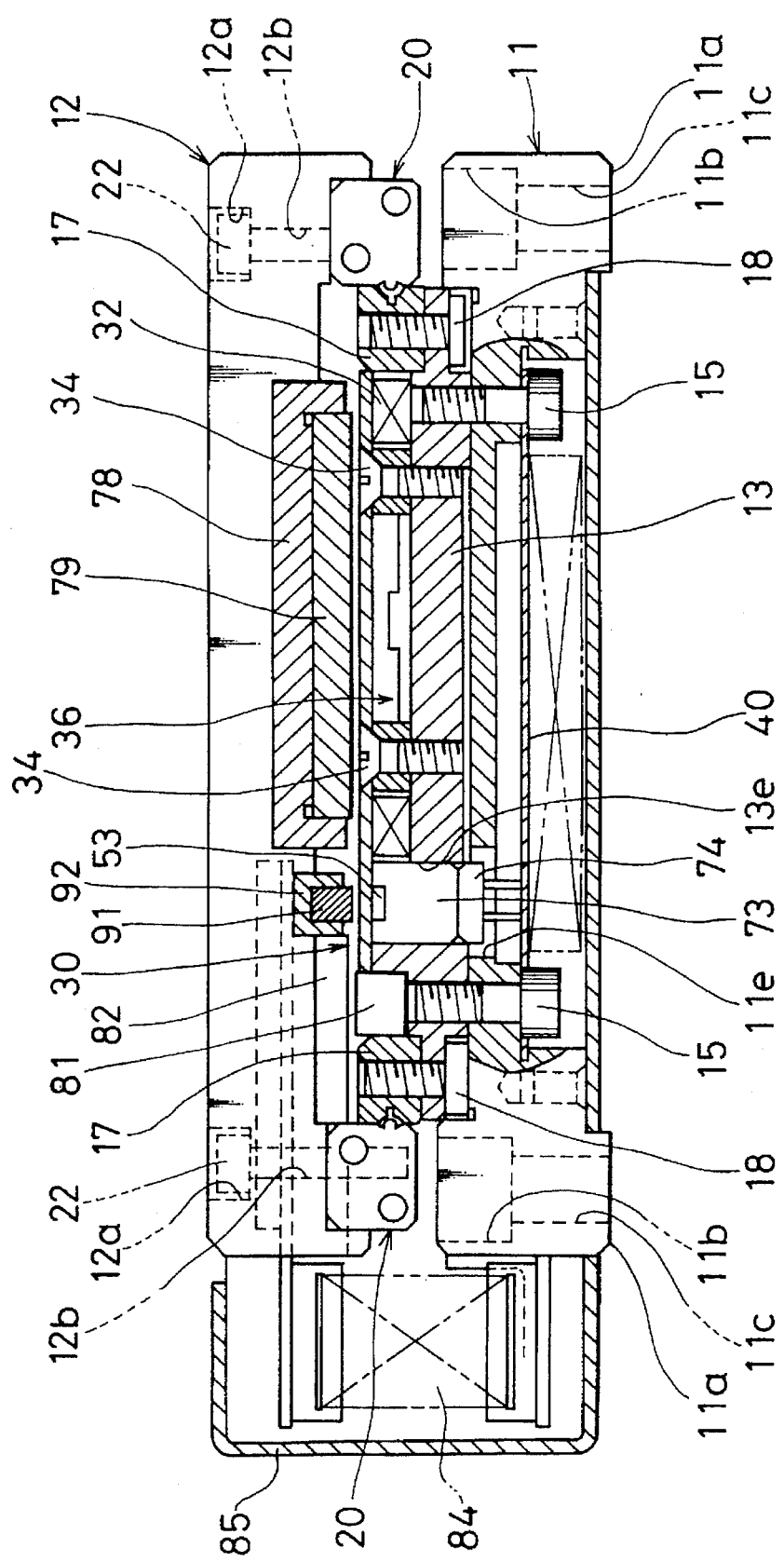
FIG. 6 is a view, including a partial cross-section, taken along arrows II—II relating to FIG. 5.

As shown in FIGS. 4 through 6, this guide unit has bed 11 formed roughly into the overall shape of, for example, a rectangle, and table 12 to move along the lengthwise direction of said bed 11. As shown in FIGS. 4 and 6, coil yoke 13, formed into roughly a rectangular shape and having nearly the same length as bed 11, is arranged on the upper surface of said bed 11, and is fastened to said bed 11 by a plurality of bolts (with hexagon sockets, see FIG. 6) 15.

Two track rails 17 in the form of track rails 17 are arranged on both sides of the upper surface of said coil yoke 13 along the lengthwise direction of said coil yoke 13, and are fastened to said coil yoke 13 by a plurality of flat head screws 18 (see FIG. 6).

Figure 7:
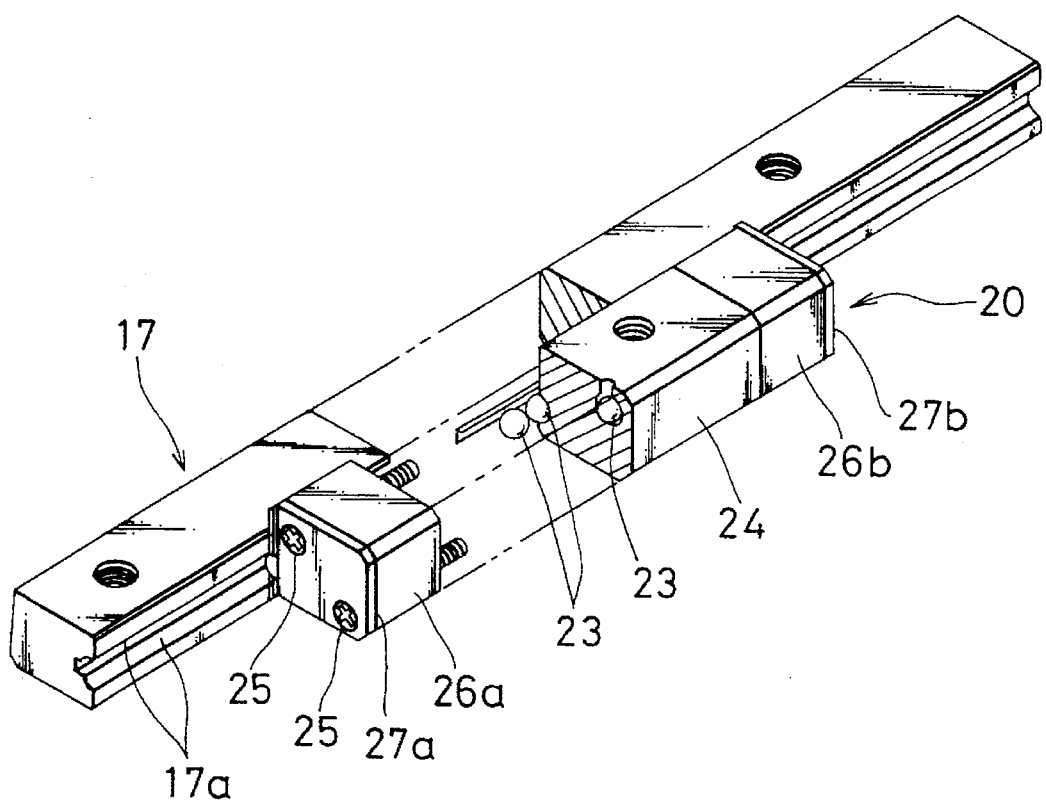
FIG. 7 is a perspective view, including a partial cross-section, of a track rail and slide member equipped on the drive unit shown in FIGS. 4 through 6.

As shown in FIG. 7, a track in the form of a single track groove 17a, having a roughly semi-circular shaped cross-section, is formed in the outside of the above-mentioned track rail 17. As is clear from FIGS. 4 and 6, a slider in the form of slide member 20, able to freely perform relative motion with respect to said track rail 17, is arranged on the outside of said track rail 17, and is fastened to the lower surface of table 12 by, for example, two bolts (with hexagon heads) 22. Furthermore, as shown in FIG. 6, countersunk portions 12a and insertion holes 12b are formed in table 12 into which the head portions and threaded portions, respectively, of bolts 22 are inserted. Bolts 22 are embedded in these countersunk portions 12a and insertion holes 12b, and do not protrude from the upper surface of table 12.

A rolling element circulating path (not shown) is formed in the above-mentioned slide member 20, and rolling elements in the form of a large number of balls 23 are arranged and contained within said rolling element circulating path. These balls 23 bear the load between track rail 17 and slide member 20 by circulating while rolling over track groove 17a of track rail 17 accompanying movement of slide member 20 with respect to track rail 17.

As shown in FIG. 7, the above-mentioned slide member 20 has casing 24, a pair of end caps 26a and 26b coupled to both ends of said casing 24 by round head screws 25, and two seals 27a and 27b fastened to the outer surfaces of both of said end caps 26a and 26b. The above-mentioned rolling element circulating path is composed of a load bearing track groove and return path formed in casing 24 mutually in parallel and passing linearly through said casing 24, and a pair of roughly arc-shaped direction changing paths formed in both end caps 26a and 26b which connect both ends of said load bearing track groove and return path. Furthermore, said load bearing track groove opposes track groove 17a of track rail 17.

The guide unit of the constitution described above is fastened to a flat mounting surface equipped on, for example, a machine tool (not shown) by a plurality of bolts (with hexagon sockets: not shown). Consequently, as shown in FIG. 6, bed 11 has flat mounting bottom surface 11a for anchoring said bed 11 to said mounting surface. As shown in FIGS. 4 through 6, countersunk portions 11b and insertion holes 11c are formed in both sides of bed 11 into which the head portions and threaded portions of the above-mentioned bolts for fastening said bed are respectively inserted. Said bolts are embedded in these countersunk portions 11b and insertion holes 11c, and do not protrude from the upper surface of bed 11. In addition, as shown in FIGS. 4 and 5, for example, four threaded holes 12c are formed in the four corners of the upper surface of table 12 able to move with respect to this bed 11, and a table (not shown) equipped on an apparatus on which said drive unit is equipped is fastened to said table 12 by bolts (not shown) screwed into these threaded holes 12c.

Continuing, the following provides a detailed description of the primary and secondary sides of the direct current linear motor which is mutually combined with the guide unit having the constitution described above.

Figure 8:
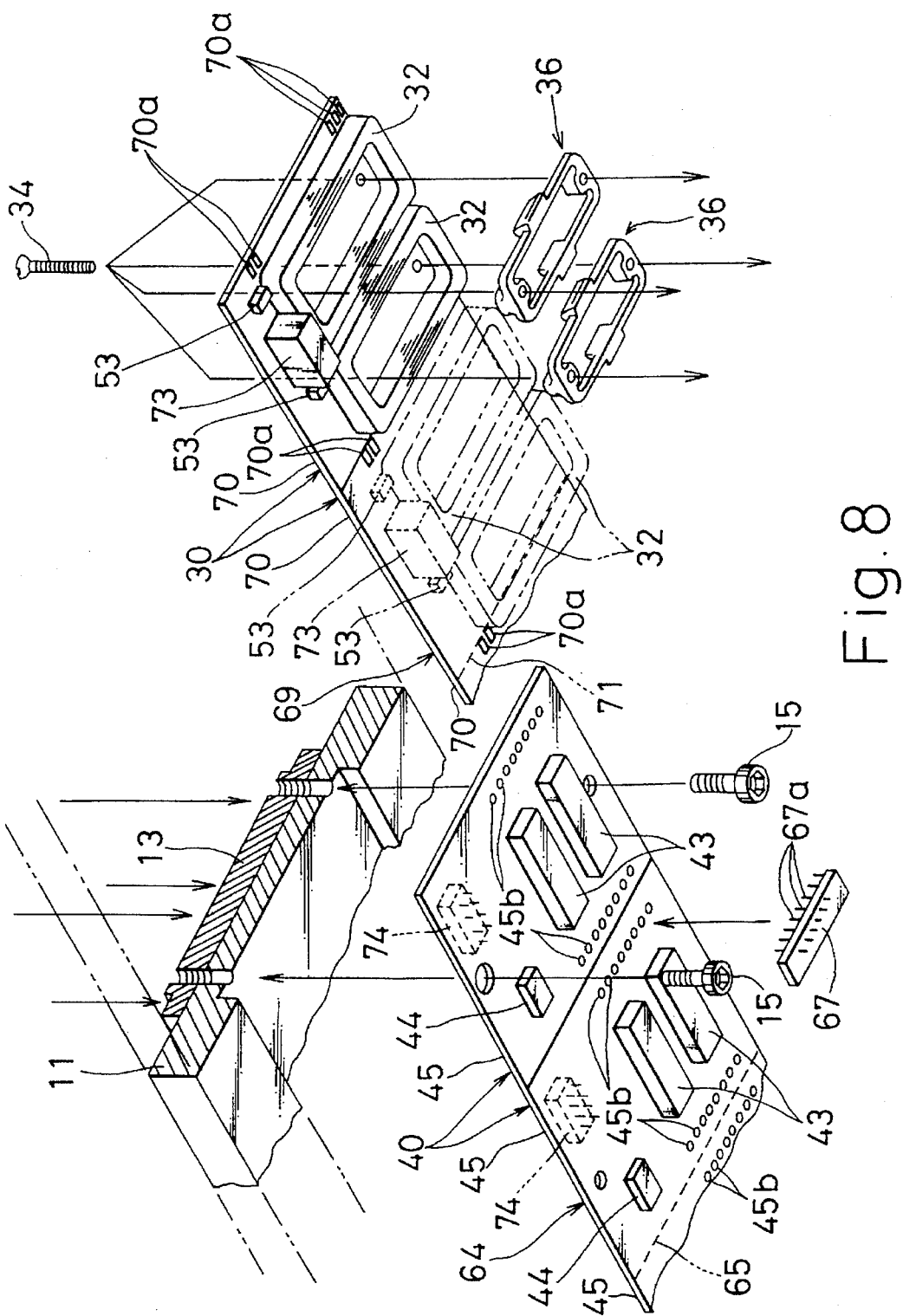
FIG. 8 is an exploded perspective view, including a partial cross-section, of the essential portion of a linear direct current motor containing the drive unit shown in FIGS. 4 through 6.

To begin with, as shown in FIGS. 4 through 6 and 8, the primary side has the previously described coil yoke 13 installed on bed 11, coil substrate 30 arranged along the lengthwise direction of coil yoke 13 on the upper surface of said coil yoke 13, and, for example, 14 armature coils 32 supported by being affixed in a row along the direction in which the above-mentioned table 12 is to move on the lower surface of said coil substrate 30, namely the side of coil yoke 13. Furthermore, each armature coil 32 is wound into roughly the shape of a rectangular loop. In addition, as shown in FIGS. 5, 6 and 8, Hall effect elements 53 are provided corresponding to each armature coil 32 on coil substrate 30.

Each of the above-mentioned armature coils 32 and coil substrate 30 are fastened together to coil yoke 13 with said coil substrate 30 on the outside by fastening members in the form of countersunk head screws 34, two each, for example, of which are inserted for each of said armature coils 32.

As shown in FIGS. 6 and 8, spacer assemblies 36 are juxtaposed between coil substrate 30, fastened by countersunk head screws 34, and coil yoke 13 into which said countersunk head screws 34 are screwed. These spacer assemblies 36 are provided so that deformation, such as warping and so forth, does not occur in coil substrate 30 caused by tightening of countersunk head screws 34, and are fit inside each armature coil 32.

Next, the following provides an explanation of the circuit substrate for performing supply of electricity and so forth to each of the above-mentioned armature coils 32.

As shown in FIGS. 4, 6 and 8, circuit substrate 40 is arranged in parallel with coil substrate 30 on the lower surface of bed 11 on which said coil substrate 30 is installed on its upper surface with coil yoke 13 in between. Moreover, said circuit substrate 40 is fastened to said bed 11 by a plurality of bolts (with hexagon sockets) 15. Furthermore, these bolts 15 serve to fasten the above-mentioned coil yoke 13 to bed 11.

As shown in FIG. 8, the above-mentioned circuit substrate 40 is composed by joining together a plurality of separate portions 45, each provided with a drive circuit composed of electronic components 43, 44 and so forth. These separate portions 45 are provided corresponding to each unit of two armature coils each of the fourteen armature coils 32 provided in a row. Thus, the number of these separate portions 45, in this case, is seven.

The drive circuit provided on each of the above-mentioned separate portions 45 contains one set of circuit portions supplying excitation current to one armature coil 32, or in other words, a circuit corresponding to two armature coils 32.

Continuing, the following provides a detailed description of the separated constitution of the above-mentioned circuit substrate 40 and coil substrate 30 arranged above it.

To begin with, the following provides an explanation of circuit substrate 40.

In the case of fabricating this circuit substrate 40, a base substrate 84, having a base length (a portion is shown in FIG. 8), is made available. This base substrate 64 is composed of, for example, six separate portions 45, explained based on FIG. 8, joined into a single unit. As was previously described, these separate portions 45 are provided with a drive circuit that performs supply of electrical power and so forth to two armature coils 32 each grouped in the form of individual units. Furthermore, as shown in FIG. 8, marks in the form of broken lines 65 are printed on both the top and bottom surfaces of base substrate 64 for distinguishing each separate portion 45.

Since the previously described circuit substrate 40 must link together seven of the above-mentioned separate portions 45, said circuit substrate 40 is completed by severing one of the six separate portions 45 possessed by the above-mentioned base substrate 64 along the above-mentioned broken line 65 to separate, arranging this separated separate portion 45 in a row at one end of unseparated base substrate 64 as shown in FIG. 8, and mutually connecting their corresponding connection terminals.

Furthermore, in FIG. 8, connection between the above-mentioned separated separate portions 45 and base substrate 64 is performed by a single connection component 67 having terminals 67a fit into through holes 45b provided at the portion of both connection terminals. Furthermore, although connection between corresponding connection terminal portions may be performed using copper wire and so forth, by performing connection using this type of connection component 67, in addition to connection being able to be performed all at once, connections are reinforced due to the rigidity of said connection component 67. In addition, besides using components that simply act to make electrical connections, electronic components such as IC and so forth may also be used for connection component 67.

The following provides an explanation of coil substrate 30.

Although the overall coil substrate 30 is not shown, in the case of fabricating this coil substrate 30, a base substrate 59 of a length nearly equal to base substrate 64 for the above-mentioned circuit substrate 40 is made available as shown in FIG. 8. This base substrate 69 is composed by linking together six separate portions 70 into a single unit in the same manner as base substrate 64 for circuit substrate 40. As shown in the drawing, two armature coils 32 each are affixed, grouped together in units, on these six separate portions 70, thus making the total number of armature coils 32 arranged in a row on base substrate 69 twelve. Furthermore, as shown in FIGS. 8 and 5, marks in the form of broken lines 71 are printed on the top and bottom surfaces of base substrate 69 to distinguish these separate portions 70. As shown in FIG. 8, circuit substrate 40 is formed by joining and connecting a single separate portion 70 separated from another base substrate not shown to one end of this unseparated base substrate 69. Furthermore, in FIG. 8, reference numeral 70a indicates connection terminals provided on each separate portion 70.

Furthermore, in the description thus far, although two armature coils 32 each and a drive circuit for driving said armature coils 32 are separated into units with respect to coil substrate 30 and circuit substrate 40, three or more armature coils and their drive circuit may also be separated into their respective units. In addition, although base substrate 64, which supports twelve armature coils 32, and base substrate 69, on which a plurality of drive circuits are arranged in a row corresponding to two of these armature coils 32 each, are made available during fabrication of the drive unit equipped with a total of fourteen armature coils 32 in the present embodiment, it is only natural that the setting of the total length of these base substrates 64 and 69, namely the numbers of armature coils and drive circuits to be equipped on these, can be suitably changed.

In addition, although coil substrate 30 and circuit substrate 40 are composed by separating at least one of separate portions 45 and 70 provided on base substrates 64 and 69, and joining it to unseparated base substrates 64 and 69 in the present embodiment, in the case the operating stroke of the drive unit to be fabricated is shorter than the total length of base substrates 64 and 69, at least one of each of separate portions 45 and 70 provided on each of said base substrates 64 and 69 should be cut away as necessary. Thus, a substrate of desired length can be easily obtained by cutting off one separated portion from the base substrate and joining to another unseparated base substrate, or simply removing a portion of the base substrate. In addition, the remaining portion of the base substrate from which a portion has been cut away as mentioned above can also be used in other applications in any state.

As shown in FIGS. 6 and 8, coil substrate 30 and circuit substrate 40, which are arranged to be mutually separated by bed 11 and coil yoke 13, are connected by connecting a plurality of, in this case seven, of connection devices in the form of both corresponding male and female connectors 73 and 74 provided on mutually opposing sides of both said substrates. One each of these connectors 73 and 74 is arranged with respect to each separate portion 45 and 70 each provided with two armature coils 32 and their drive circuit grouped into a unit as previously described. As shown in FIG. 6, said connectors 73 and 74 are mutually connected through apertures 11e and 13e formed in bed 11 and coil yoke 13. Thus, since one each of connectors 73 and 74 is provided for each of separate portions 45 and 70 of coil substrate 30 and circuit substrate 40, when mutually assembling both said separate portions 45 and 70, the directions of both can be recognized both quickly and easily, thus facilitating assembly work. Furthermore, connection of corresponding separate portions 45 and 70 may be performed by lead wires and not by connectors as described above. In addition, with respect to the number of connectors, besides providing only one connector for each of separate portions 45 and 70 as mentioned above, two or more connectors may also be provided.

On the other hand, the secondary side of the linear direct current motor is composed in the manner described below.

Figure 9:
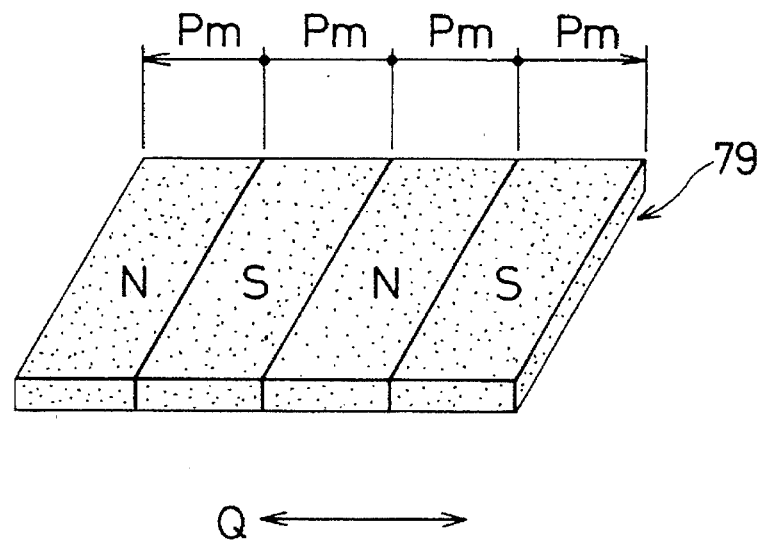
FIG. 9 is a perspective view of a field magnet which is one of the constituent members of the secondary side of a linear direct current motor containing the drive unit shown in FIGS. 4 through 6.

As shown in FIGS. 4 and 6, said secondary side has magnet yoke 78, mounted on the lower side of table 12, and field magnet 79 anchored on the lower surface of said magnet yoke 78 to oppose each of the above-mentioned armature coils 32 of the primary side. As shown in FIG. 9, the overall shape of field magnet 79 is formed into roughly that of a rectangular plate, and a plurality of N and S magnetic poles, for example 4, are magnetized so as to be alternately arranged in a row along direction Q in which relative movement is performed by the primary and secondary sides, namely the lengthwise direction of bed 11.

In the drive unit having said constitution, a position detection device having the constitution described below is provided for detection of the relative positions of the above-mentioned bed 11 and table 12.

Namely, said position detection device is composed of linear magnetic scale 81 shown in FIGS. 4 through 6, and magnetic sensor portion 82 shown in FIG. 6. Said linear magnetic scale 81 extends in the direction of movement of the above-mentioned table 12, and together with a large number of N and S magnetic poles being alternately magnetized at a precise pitch along its lengthwise direction, an origin signal magnetized portion is formed on one end. On magnetic sensor portion 82, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement.

Furthermore, as shown in FIGS. 4 and 6, cables in the form of flexible substrates 84 for obtaining signals from the above-mentioned magnetic sensor portion 82, and cover 85, which covers said flexible substrates 84, are provided.

In the drive unit having the above-mentioned constitution, by supplying a prescribed excitation current to each armature coils 32, thrust is produced based on Fleming's right hand rule between the primary and secondary sides. For example, if base member 11, to which the primary side is coupled, is taken to be the stationary side, table 12, integrated into a single unit with the secondary side, is moved by this thrust. Moreover, the position of table 12 with respect to bed 11 is detected by the position detection device described above.

The following provides an explanation of the constitution of the control system for controlling the supply of electrical power to each armature coil 32 described above.

Figure 10:
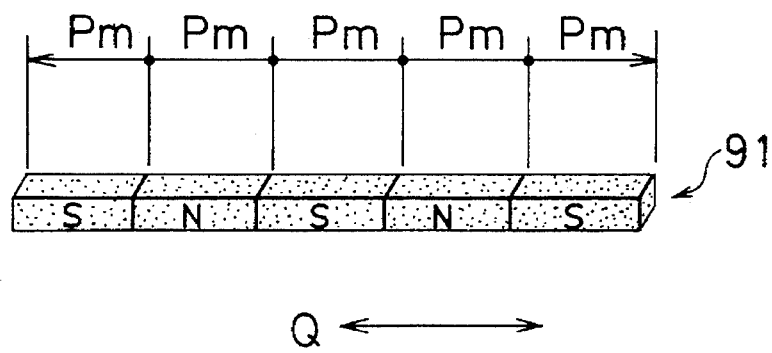
FIG. 10 is a perspective view of a magnetic pole detection magnet which is a constituent member of a linear direct current motor containing the drive unit shown in FIGS. 4 through 6.

As shown in FIG. 6, magnetic pole detection magnet 91 is arranged to the side of field magnet 79, and is mounted to the lower surface of table 12 together with magnet yoke 92. FIG. 10 is a perspective view of this magnetic pole detection magnet 91. As is clear from this drawing, said magnetic pole detection magnet is formed into a long shape, and is magnetized by alternately arranging a plurality of N and S magnetic poles in a row along direction Q, the direction in which relative movement is performed by the primary and secondary sides, in the same manner as the above-mentioned field magnet 79. However, the number of magnetic poles of said magnetic pole detection magnet 91 is set at five, or one greater than the 4 magnetic poles of field magnet 79. In addition, as is clear from FIGS. 9 and 10, the width of each magnetic pole of said magnetic pole detection magnet 91 is set at pm, which is equal to the magnetic pole width of field magnet 79.

Figure 11:
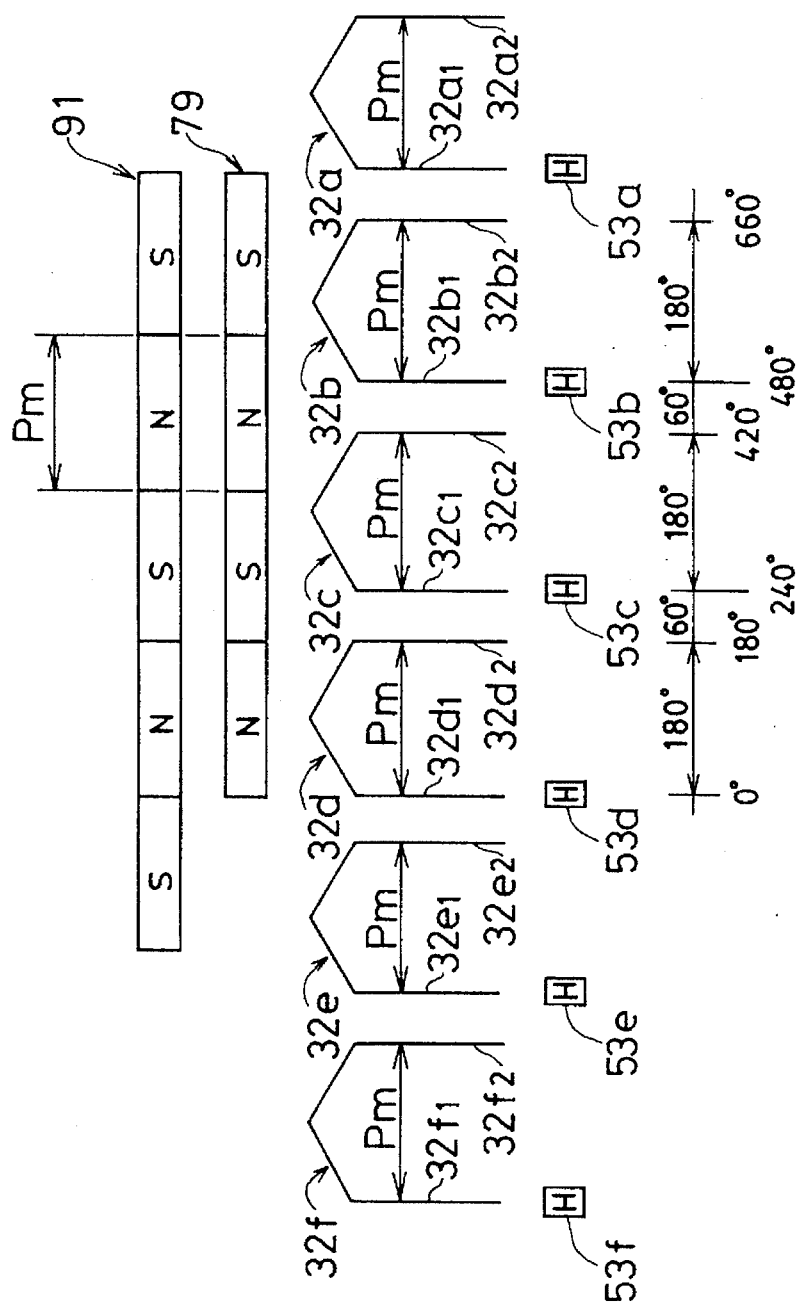
FIG. 11 is a conceptual drawing of the constitution of a linear direct current motor containing the drive unit shown in FIGS. 4 through 6.

In the case of the present embodiment, as shown in FIG. 11, magnetic pole detection magnet 91 is arranged in parallel with field magnet 79 so that each of its magnetic poles corresponds with the same magnetic pole of said field magnet 79. Furthermore, as is also shown in FIG. 11, the open angle width of conductors $32a_1$ through $32f_1$ and $32a_2$ through $32f_2$, of which two sides each are possessed by each armature coil 32a through 32f and which contribute to generation of thrust in the present embodiment (six armature coils are shown in FIG. 11 in this case, and these six armature coils are mutually distinguished by adding small letters of the alphabet from a through f to reference numeral 32 indicating armature coils in the explanation thus far for the sake of convenience in the explanation), are set to be equal to width pm of each magnetic pole of field magnet 79 and magnetic pole detection magnet 91. However, the open angle width of the armature coils is set to be roughly 2n−1 times (where n is an integer of at least 1) the magnetic pole width of field magnet 79. Normally, n is set to a value of 1, and is set to that value in the present embodiment. In addition, although four is set for the number of magnetic poles of field magnet 79 in the present embodiment, the number of magnetic poles is not limited to this number, but rather should be any number of at least 2 (provided said number is an integer).

As shown in FIG. 11, based on the above-mentioned constitution, magnetic pole discrimination elements in the form of Hall effect elements 53a through 53f are arranged in the vicinity of each armature coil 32a through 32f (six Hall effect elements are shown in FIG. 11 in this case, and the small letters of a through f are added to reference numeral 53 used to indicate Hall effect elements in the aforementioned explanation to mutually distinguish these six Hall effect elements for the sake of convenience in the explanation). These Hall effect elements 53a through 53f are arranged so as to be of the same phase as each of the magnetic poles of the above-mentioned magnetic pole detection magnet 91. In the present embodiment, each of Hall effect elements 53a through 53f is arranged corresponding to conductors $32a_1$ through $32f_1$ on one side among the conductors that contribute to thrust possessed on two sides by each armature coil 32a through 32f. Furthermore, in the case of the present embodiment, the above-mentioned magnetic pole detection magnet 91 is arranged is to be protruding by the amount of one magnetic pole with respect to field magnet 79 in the direction towards said conductors $32a_1$ through $32f_1$ on one side from conductors $32a_2$ through $32f_2$ on the other side as is clear from FIG. 11.

These Hall effect elements 53a through 54f emit a signal (in the form a potential difference) corresponding to the lines of magnetic force emitted by each magnetic pole possessed by magnetic pole detection magnet 91 when said magnetic pole detection magnet 91 approaches. This signal is then fed to the above-mentioned drive circuit, and electrical power is supplied to the armature coil corresponding to the Hall effect element that emitted said signal based on that signal. On the other hand, this supply of electrical power is interrupted to the armature coil corresponding to a Hall effect element for which said signal has yet to be obtained or is no longer being obtained, thus enabling control to be performed. Thus, by systematically supplying a prescribed excitation current to each armature coil, thrust is produced based on Fleming's right hand rule between the primary and secondary sides. For example, if bed 11, to which the primary side is coupled, is taken to be the stationary side, table 12, integrated into a single unit with the secondary side, is moved by this thrust.

Supply of electrical power is controlled in the manner described below based on the above-mentioned constitution.

Figure 12:
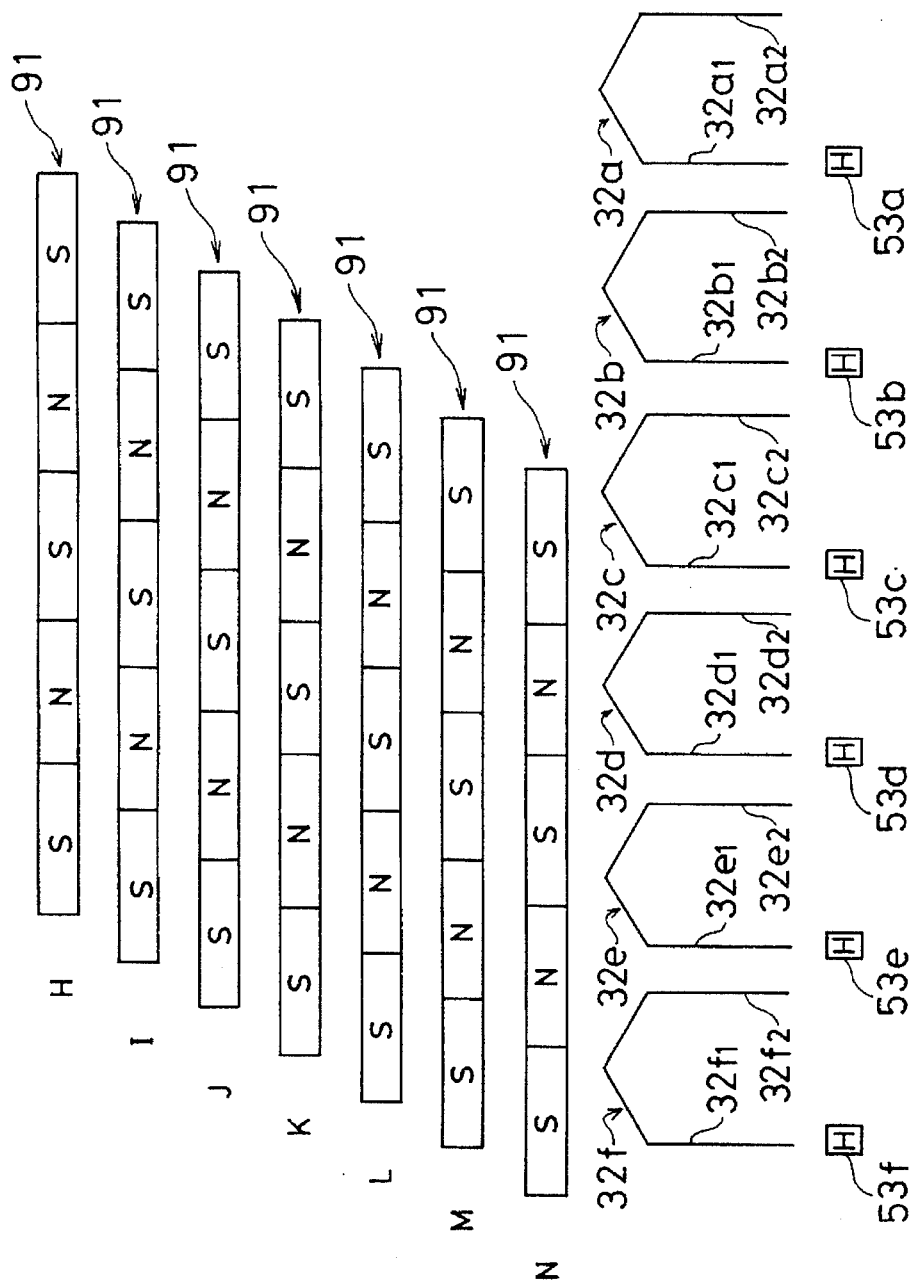
FIG. 12 is an explanatory drawing of the operation of a linear direct current motor containing the drive unit shown in FIGS. 4 through 6.
Figure 13:
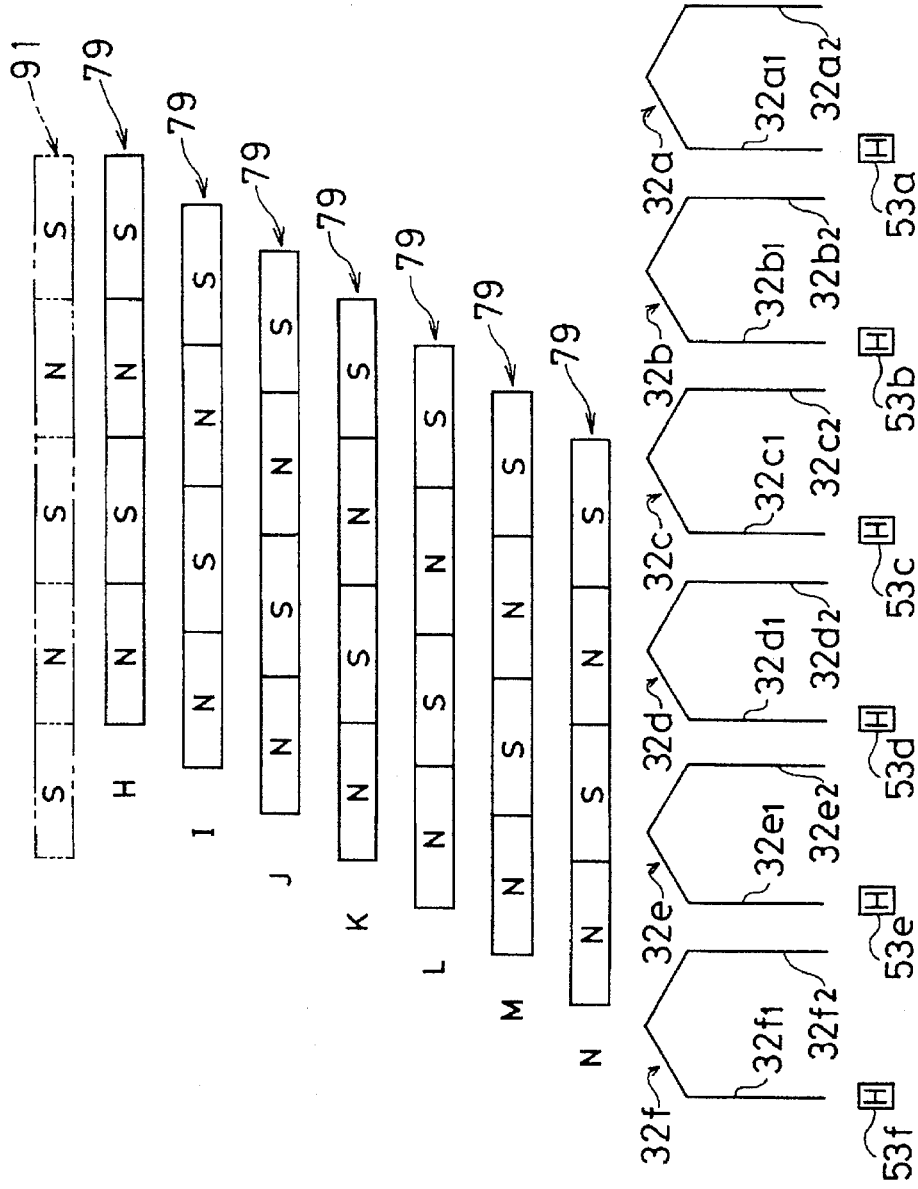
FIG. 13 is an explanatory drawing of the operation of a linear direct current motor containing the drive unit shown in FIGS. 4 through 6.

In FIGS. 12 and 13, letters H through N indicate that there is field magnet 79 and magnetic pole detection magnet 91 corresponding to those letters.

To begin with, in the case field magnet 79 and magnetic pole detection magnet 91 are at the above-mentioned position H, each of the magnetic poles of said magnetic pole detection magnet 91 act on the four Hall effect elements 53a through 53d as shown in FIG. 12. However, the two Hall effect elements 53a and 53d, on which the ends of the magnetic poles and the boundaries of corresponding magnetic poles of said magnetic pole detection magnet 91 act, do not respond. Only the remaining two Hall effect elements 53b and 53c respond. Thus, the two armature coils 32b and 32c, which respectively correspond to these Hall effect elements 53b and 53c, are supplied with electrical power. In this state, as is clear from FIG. 13, since each conductor $32b_1$, $32b_2$, $32c_1$ and $32c_2$, which contribute to thrust and of which two sides each are possessed by both said armature coils 32b and 32c, is not acted on by the boundaries of each magnetic pole or ends of the magnetic poles of field magnet 79, and does not end up becoming displaced from each magnetic pole, all of these four conductors generate thrust.

Next, in the case field magnet 79 and magnetic pole detection magnet 91 are at position I, each of the magnetic poles of said magnetic pole detection magnet 91 act on the four Hall effect elements 53b through 53e as shown in FIG. 12. However, the two Hall effect elements 53b and 53e, on which the ends of the magnetic poles and the boundaries of corresponding magnetic poles of said magnetic pole detection magnet 91 act, do not respond. Only the remaining two Hall effect elements 53c and 53d respond. Accordingly, the two armature coils 32c and 32d, which respectively correspond to these two Hall effect elements 53c and 53d, are supplied with electrical power. As is clear from FIG. 13, when in this state, since each conductor $32c_1$, $32c_2$, $32d_1$ and $32d_2$, which contribute to thrust and of which two sides each are possessed by both said armature coils 32c and 32d, is not acted on by the boundaries of each magnetic pole or ends of the magnetic poles of field magnet 79, and does not end up becoming displaced from each magnetic pole, all of these four conductors generate thrust.

Although all following similar explanations are omitted, when field magnet 79 and magnetic pole detection magnet 91 are at each of the remaining positions J through N, among those conductors that contribute to thrust possessed by each armature coil, the number of those conductors that actually generate thrust is four at any position. In addition, this applies similarly in the opposite case of moving towards position H from position N. Thus, the number of conductors of the armature coils that generate thrust remains constant regardless of changes in relative position of the primary and secondary sides.

Furthermore, although each Hall effect element 53a through 53f is, for example, arranged respectively corresponding to conductors $32a_1$ through $32f_1$ on one side of armature coils 32a through 32f in the present embodiment as shown in FIG. 11, the arrangement positions of the Hall effect elements are not limited to these positions.

More specifically, in FIG. 11, if the position at which each Hall effect element is currently arranged, namely the position of conductors $32a_1$ through $32f_1$ on the left side of each armature coil 32a through 32f, is expressed as an electrical angle of 0° (in the drawing, however, the position of Hall effect element 53d, namely the position of conductor $32d_1$ of armature coil 32d, is typically indicated as 0°), the electrical angle positions of the conductors of each armature coil are as shown in the drawing in the case of a linear direct current motor like that in the present embodiment having 4 poles and 3 coils. Each Hall effect element is not required to be arranged at 0°, but may be arranged at any arbitrary position such as 90° or 380°. The position of magnetic pole detection magnet 91 with respect to field magnet 79 shown in FIG. 11 is the position at which it should be set in the case each Hall effect element is arranged at the above-mentioned position having an electrical angle of 0°.

Figure 14:
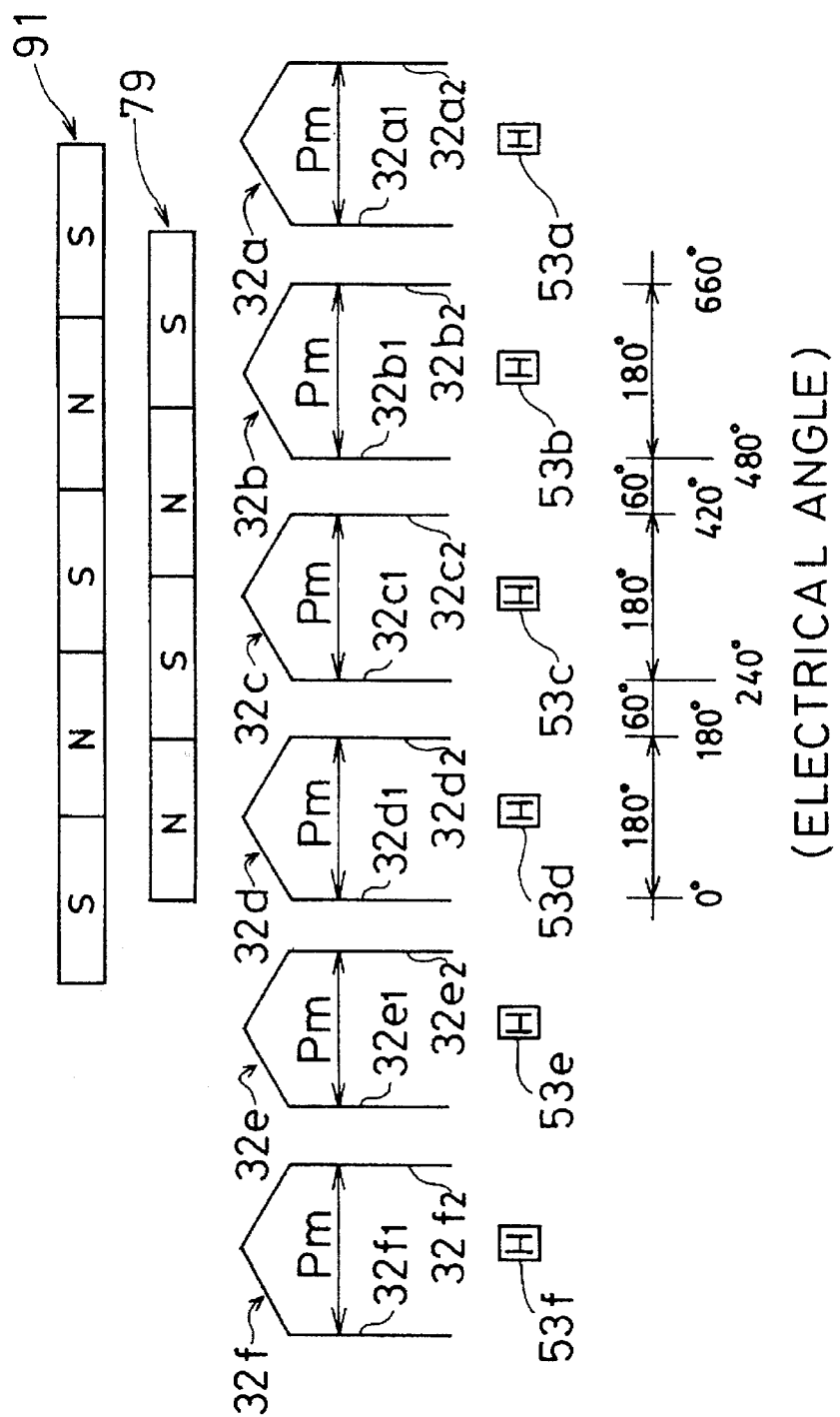
FIG. 14 is a conceptual drawing of the constitution of a linear direct current motor as another embodiment of the present invention.

Furthermore, in the case of focusing on, for example, Hall effect element 53d of the above-mentioned Hall effect elements, in the case said Hall effect element is arranged within an electrical angle position range of 0°≦θ≦180°, armature coil 32d in the vicinity of said Hall effect element 53d is supplied with electrical power based on the signal emitted from said Hall effect element 53d. In addition, in the case Hall effect element 53d is arranged within a range of 240°≦θ≦420° corresponding to armature coil 32c located just before said armature coil 32d, electrical power is supplied to armature coil 32d in the state in which it is located one position to the front in response to the signal from said Hall effect element 53d. Thus, in the case of setting the position of a Hall effect element to an electrical angle position other than 0° it is necessary to also shift the relative position of magnetic pole detection magnet 91 with respect to field magnet 79 from the position shown in FIG. 11 so that it corresponds to the position of that Hall effect element in the same phase. FIG. 14 indicates a specific example of another embodiment of the present invention. FIG. 14 shows the state wherein each Hall effect element 53a through 53f has been set to a position having an above-mentioned electrical angle of 90°. As shown in this drawing, the position of magnetic pole detection magnet 91 with respect to field magnet 79 is also shifted by an electrical angle of 90° from the state shown in FIG. 11.

In addition, although a guide unit having a mechanical constitution is shown for the guiding device that performs mutual guiding of the primary side and secondary side in the above-mentioned embodiments, a guiding device can be employed having a constitution that relatively levitates both primary and secondary sides by the pressure of a fluid (air or oil) or magnetic force.

In addition, although a moving magnet type of linear direct current motor is shown in the above-mentioned embodiments wherein the side containing armature coils 32 is taken to be the stationary side and the side containing field magnet 79 is taken to be the moving side, the present invention can also be applied to a moving coil type of linear direct current motor.

Moreover, the present invention may be applied similarly in the form of another embodiment in the case of bed 11 and so forth having a certain curvature, and the present invention performing curved motion.

According to the present invention as has been explained above, since the number of conductors of armature coils generating thrust remains constant regardless of changes in the relative positions of the primary and secondary sides, the present invention offers the advantage of being able to maintain a constant level of thrust at all times.

What is claimed is:

1. A linear direct current motor comprising:
   a field magnet in which P number of poles (P being an integer of at least 2) are arranged and magnetized so that said poles are sequentially different;
   a group of armature coils wound so that an open angle width of each one of said armature coils is the same as a magnetic pole width of said field magnet, said armature coils being arranged so as to oppose said field magnet and receiving an excitation current for driving said field magnet relative to said armature coils;
   a magnetic pole detection magnet, having a magnetic pole width equal to the magnetic pole width of said field magnet, and having a magnetized state which is the same as a magnetized state of said field magnet, said magnetic pole detection magnet being arranged substantially parallel to said field magnet; and
   magnetic pole discrimination elements provided so as to correspond to each one of said armature coils for discriminating magnetic poles of said magnetic pole detection magnet; wherein,
   said magnetic pole detection magnet has P+1 magnetic poles, and each one of the magnetic poles of said magnetic pole detection magnet and each one of said magnetic pole discrimination elements is arranged so as to be mutually corresponding in the same phase.

2. A linear direct current motor as recited in claim 1, wherein a total thrust generated by said armature coils is constant regardless of changes in relative positions of said field magnet and said armature coils.

3. A linear direct current motor as recited in claim 1, wherein each one of said armature coils comprises left side conductors for generating thrust and right side conductors for generating thrust, and wherein each one of said magnetic pole discrimination elements is aligned with the left side conductors of respective ones of said armature coils.

4. A linear direct current motor as recited in claim 1, wherein the magnetic poles of said field magnet are aligned with the magnetic poles of said magnetic pole detection magnet in a direction transverse to the direction of relative movement between said field magnet and said armature coils.

5. A linear direct current motor as recited in claim 1, wherein the magnetic poles of said field magnet are shifted with respect to the magnetic poles of said magnetic pole detection magnet in the direction of relative movement between said field magnet and said armature coils.

6. A linear direct current motor as recited in claim 1, wherein said magnetic pole discrimination elements are spaced apart from each other by an electrical angle of 240°.

7. A linear direct current motor as recited in claim 3, wherein the magnetic poles of said field magnet are aligned with the magnetic poles of said magnetic pole detection magnet in a direction transverse to the direction of relative movement between said field magnet and said armature coils.

8. A linear direct current motor as recited in claim 1, wherein each one of said armature coils comprises left side conductors for generating thrust and right side conductors for generating thrust, and wherein said magnetic pole discrimination elements are disposed between the left side conductors and the right side conductors of respective ones of said armature coils.

9. A linear direct current motor as recited in claim 8, wherein the magnetic poles of said field magnet are shifted with respect to the magnetic poles of said magnetic pole detection magnet in the direction of relative movement between said field magnet and said armature coils.

10. A linear direct current motor as recited in claim 9, wherein the magnetic poles of said field magnet are shifted with respect to the magnetic poles of said magnetic pole detection magnet by a predetermined electrical angle, and wherein said magnetic pole discrimination elements are shifted by the same predetermined angle from one of the left and right side conductors of respective ones of said armature coils.

11. A linear direct current motor comprising:
    a field magnet in which P number of poles (P being an integer of at least 2) are arranged and magnetized so that said poles are sequentially different;
    a group of armature coils wound so that an open angle width of each one of said armature coils is approximately 2n−1 times (where n is an integer of at least 1) the magnetic pole width of said field magnet, said armature coils being arranged so as to oppose said field magnet and receiving an excitation current for driving said field magnet relative to said armature coils;
    a magnetic pole detection magnet, having a magnetic pole width equal to the magnetic pole width of said field magnet, and having a magnetized state which is the same as a magnetized state of said field magnet, said magnetic pole detection magnet being arranged substantially parallel to said field magnet; and magnetic pole discrimation elements provided so as to correspond to each one of said armature coils for discriminating magnetic poles of said magnetic pole detection magnet; wherein, the number of magnetic poles of said magnetic pole detection magnet is set to be P+(2n−1), and each one of the magnetic poles of said magnetic pole detection magnet and each one of said magnetic pole discrimination elements is arranged so as to be mutually corresponding in the same phase.

* * * * *